United States Patent
Kurihara et al.

(10) Patent No.: US 10,699,395 B2
(45) Date of Patent: Jun. 30, 2020

(54) IMAGE PROCESSING DEVICE, IMAGE PROCESSING METHOD, AND IMAGE CAPTURING DEVICE

(71) Applicant: MITSUBISHI ELECTRIC CORPORATION, Tokyo (JP)

(72) Inventors: Kohei Kurihara, Tokyo (JP); Yoshitaka Toyoda, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/328,668

(22) PCT Filed: Aug. 16, 2017

(86) PCT No.: PCT/JP2017/029441
§ 371 (c)(1),
(2) Date: Feb. 26, 2019

(87) PCT Pub. No.: WO2018/070100
PCT Pub. Date: Apr. 19, 2018

(65) Prior Publication Data
US 2019/0228512 A1    Jul. 25, 2019

(30) Foreign Application Priority Data

Oct. 14, 2016   (JP) ................................ 2016-202175

(51) Int. Cl.
| | |
|---|---|
| *G06T 5/50* | (2006.01) |
| *H04N 9/78* | (2006.01) |
| *G06T 5/00* | (2006.01) |
| *G06T 3/00* | (2006.01) |
| *H04N 5/225* | (2006.01) |
| *H04N 9/64* | (2006.01) |
| *H04N 5/243* | (2006.01) |
| *H04N 5/232* | (2006.01) |

(52) U.S. Cl.
CPC .............. *G06T 5/50* (2013.01); *G06T 3/0068* (2013.01); *G06T 5/00* (2013.01); *G06T 5/002* (2013.01);
(Continued)

(58) Field of Classification Search
CPC ........ G06T 5/003; G06T 5/50; H04N 5/23229
See application file for complete search history.

(56) References Cited

U.S. PATENT DOCUMENTS

| | | | | |
|---|---|---|---|---|
| 2006/0132642 A1* | 6/2006 | Hosaka | ................... | H04N 5/217 348/370 |
| 2007/0201738 A1* | 8/2007 | Toda | ...................... | H04N 9/045 382/144 |

(Continued)

FOREIGN PATENT DOCUMENTS

| | | |
|---|---|---|
| JP | 2006-180269 A | 7/2006 |
| JP | 2008-011291 A | 1/2008 |

(Continued)

*Primary Examiner* — Rowina J Cattungal
(74) *Attorney, Agent, or Firm* — Birch, Stewart, Kolasch & Birch, LLP

(57) ABSTRACT

An image processing device includes an invisible image filter separator that separates an invisible detail component, a visible image filter separator that separates a visible base component and a visible detail component, a base luminance color separator that separates a visible luminance base component and a visible color base component, a detail luminance color separator that separates a visible luminance detail component, a detail synthesizer that generates a synthetic luminance detail component, a synthetic luminance component generator that generates a synthetic luminance component, and a luminance color synthesizer that generates a synthetic image.

11 Claims, 7 Drawing Sheets

(52) U.S. Cl.
CPC ........... *H04N 5/2258* (2013.01); *H04N 5/232* (2013.01); *H04N 5/243* (2013.01); *H04N 9/646* (2013.01); *H04N 9/78* (2013.01); *G06T 2207/10024* (2013.01); *G06T 2207/10048* (2013.01); *G06T 2207/20024* (2013.01); *G06T 2207/20192* (2013.01); *G06T 2207/20208* (2013.01)

(56) References Cited

U.S. PATENT DOCUMENTS

| | | | | |
|---|---|---|---|---|
| 2013/0083157 | A1* | 4/2013 | Kamon | H04N 9/045 348/33 |
| 2014/0192202 | A1* | 7/2014 | Sano | H04N 5/332 348/164 |
| 2014/0340515 | A1* | 11/2014 | Tanaka | G06T 5/003 348/143 |
| 2016/0065865 | A1* | 3/2016 | Shiokawa | H04N 9/045 348/164 |
| 2016/0212348 | A1 | 7/2016 | Tatsumi | |

FOREIGN PATENT DOCUMENTS

| | | |
|---|---|---|
| JP | 2014-135627 A | 7/2014 |
| JP | 2014-241584 A | 12/2014 |
| JP | 2016-039409 A | 3/2016 |
| JP | 2016-082390 A | 5/2016 |
| JP | 2016-136374 A | 7/2016 |
| WO | WO 2011/155135 A1 | 12/2011 |

* cited by examiner

IMAGE PROCESSING DEVICE, IMAGE PROCESSING METHOD, AND IMAGE CAPTURING DEVICE

TECHNICAL FIELD

The present invention relates to an image processing device, an image processing method and an image capturing device for generating a synthetic image having high visibility from a first image acquired by receiving light in a first wavelength range from an image capture object and a second image acquired by receiving light in a second wavelength range from the same image capture object.

BACKGROUND ART

There exists an image integration technology for generating an image having high visibility by selecting multiple types of images differing in image features, such as a visible image and an infrared image, an RGB image and a narrow-band image, or the like, depending on the scene (condition of the image capture object, condition around the image capture object, or the like) and integrating (combining) the selected images. For example, near-infrared images achieve high visibility when a haze has occurred or in a high dynamic range environment, while narrowband images obtained by image capture from a satellite or a drone are suitable for use for monitoring the seas and vegetation regions. Further, widely available on the market are monitoring devices including an irradiation device for irradiating the object with invisible light, such as a near-infrared light source, and a camera for acquiring an image with a high signal level and a low noise level and being suitable for monitoring scenes in the nighttime. By combining one of such images differing in the image features with a visible image, an object or target that should be paid attention to can be distinguished with ease even when a scene in which the distinction is difficult only with a visible image has been captured.

Patent Reference 1 describes an image processing method for accurately enhancing edges included in a first image for display, among the first image and a second image obtained by image capture of the same object in different conditions, by using edge components of the second image.

PRIOR ART REFERENCE

Patent Reference

Patent Reference 1: Japanese Patent Application Publication No. 2014-241584 (Claim 1, FIG. 2, Paragraph 0127)

SUMMARY OF THE INVENTION

Problem to be Solved by the Invention

However, the image processing method described in the Patent Reference 1 has a problem in that noise is contained in a visible image under low illuminance conditions. Specifically, while the technology of the Patent Reference 1 is capable of suppressing noise by adjusting an edge amount in regard to noise contained in a luminance component of the visible image, noise contained in a color component of the visible image (hereinafter referred to also as "color noise") is directly used for the synthesis, and thus the color noise is not suppressed sufficiently and it is impossible to generate an image (image data) having high visibility.

It is therefore an object of the present invention to provide an image processing device, an image processing method and an image capturing device capable of generating a high visibility synthetic image with reduced influence of color noise even when a scene in which color noise is contained in an image has been captured.

Means for Solving the Problem

An image processing device according to an aspect of the present invention is an image processing device for generating a synthetic image from a first image acquired by receiving light in a first wavelength range and a second image acquired by receiving light in a second wavelength range different from the first wavelength range, the first image and the second image having a same visual field. The image processing device includes: a first image separator to separate, from the first image, a first luminance base component that is a luminance component separated from a first base component that is a base component of the first image, a first color base component that is a color component separated from the first base component, and a first luminance detail component that is a luminance component separated from a first detail component that is a detail component of the first image; a second image separator to separate a second detail component that is a detail component of the second image from the second image; a detail synthesizer to generate a synthetic luminance detail component that is a value obtained by taking a summation average of a first gain adjustment component obtained by performing gain adjustment on the first luminance detail component and a second gain adjustment component obtained by performing gain adjustment on the second detail component; a synthetic luminance component generator to generate a synthetic luminance component by combining the synthetic luminance detail component and the first luminance base component; and a luminance color synthesizer to generate the synthetic image by combining the synthetic luminance component and the first color base component.

An image capturing device according to another aspect of the present invention includes the above-described image processing device and an image sensor that includes infrared pixels for detecting infrared light, red pixels for detecting red light, green pixels for detecting green light, and blue pixels for detecting blue light and acquires the invisible image and the visible image.

An image processing method according to another aspect of the present invention is an image processing method for generating a synthetic image from a first image acquired by receiving light in a first wavelength range and a second image acquired by receiving light in a second wavelength range different from the first wavelength range, the first image and the second image having a same visual field. The image processing method includes: a first image separation step of separating, from the first image, a first luminance base component that is a luminance component separated from a first base component that is a base component of the first image, a first color base component that is a color component separated from the first base component, and a first luminance detail component that is a luminance component separated from a first detail component that is a detail component of the first image; a second image separation step of separating a second detail component that is a detail component of the second image from the second image; a detail synthesis step of generating a synthetic luminance detail component that is a value obtained by taking a summation average of a first gain adjustment component obtained by performing gain adjustment on the first luminance detail component and a second gain adjustment component obtained by performing gain adjustment on the second detail component; a synthetic luminance component generation step of generating a synthetic luminance component by combining the synthetic luminance detail component and the first luminance base component; and a luminance color synthesis step of generating the synthetic image by combining the synthetic luminance component and the first color base component.

Effect of the Invention

According to the present invention, a high visibility synthetic image with reduced influence of color noise can be generated even when a scene in which a visible image contains color noise has been captured.

MODE FOR CARRYING OUT THE INVENTION

Image processing devices, image processing methods and image capturing devices according to embodiments will be described below with reference to drawings.

In the image processing devices and the image processing methods according to the embodiments, a synthetic image excelling in visibility is generated from a first image (e.g., visible image, RGB image or the like) acquired by an image capturing device (photoreceptor elements) by receiving light in a first wavelength range and a second image (e.g., invisible image, white image or the like) acquired by the image capturing device (photoreceptor elements) by receiving light in a second wavelength range different from the first wavelength range.

In the following description, a visible image means an image (image data) generated by image capture by an image capturing device capable of imaging rays of light visible to the human eye (visible light). An invisible image means an image not being a visible image, namely, an image (image data) generated by image capture by an image capturing device capable of imaging rays of light invisible to the human eye (invisible light). In general, the visible light means light in a wavelength range of approximately 400 nm to 700 nm, which includes light in red (R), green (G) and blue (B) wavelength ranges, for example. The visible light means light in a range other than the range of the visible light, which includes ultraviolet light (in general, light in a wavelength range below or equal to approximately 400 nm) or infrared light (in general, light in a wavelength range above or equal to approximately 700 nm), for example.

Further, in the following embodiments, image data is processed after being separated into a detail component and a base component that is a component other than the detail component. The detail component is a component in which the pixel value (signal value) of each pixel changes rapidly by small amounts compared to neighboring pixels, which is referred to also as a high-frequency component. The base component is a component in which the pixel value of each pixel does not change rapidly by small amounts compared to neighboring pixels, which is referred to also as a low-frequency component. Thus, the detail component represents rapid minute changes of pixel values in the image, and the base component represents even changes of pixel values in a certain range in the image. The detail component is a reflected light component from the subject, for example, and the base component is an illuminating light component, for example.

Furthermore, the inventions of the image processing devices described below can be regarded also as inventions of image processing methods.

(1) First Embodiment (1-1) Configuration

Figure 1:
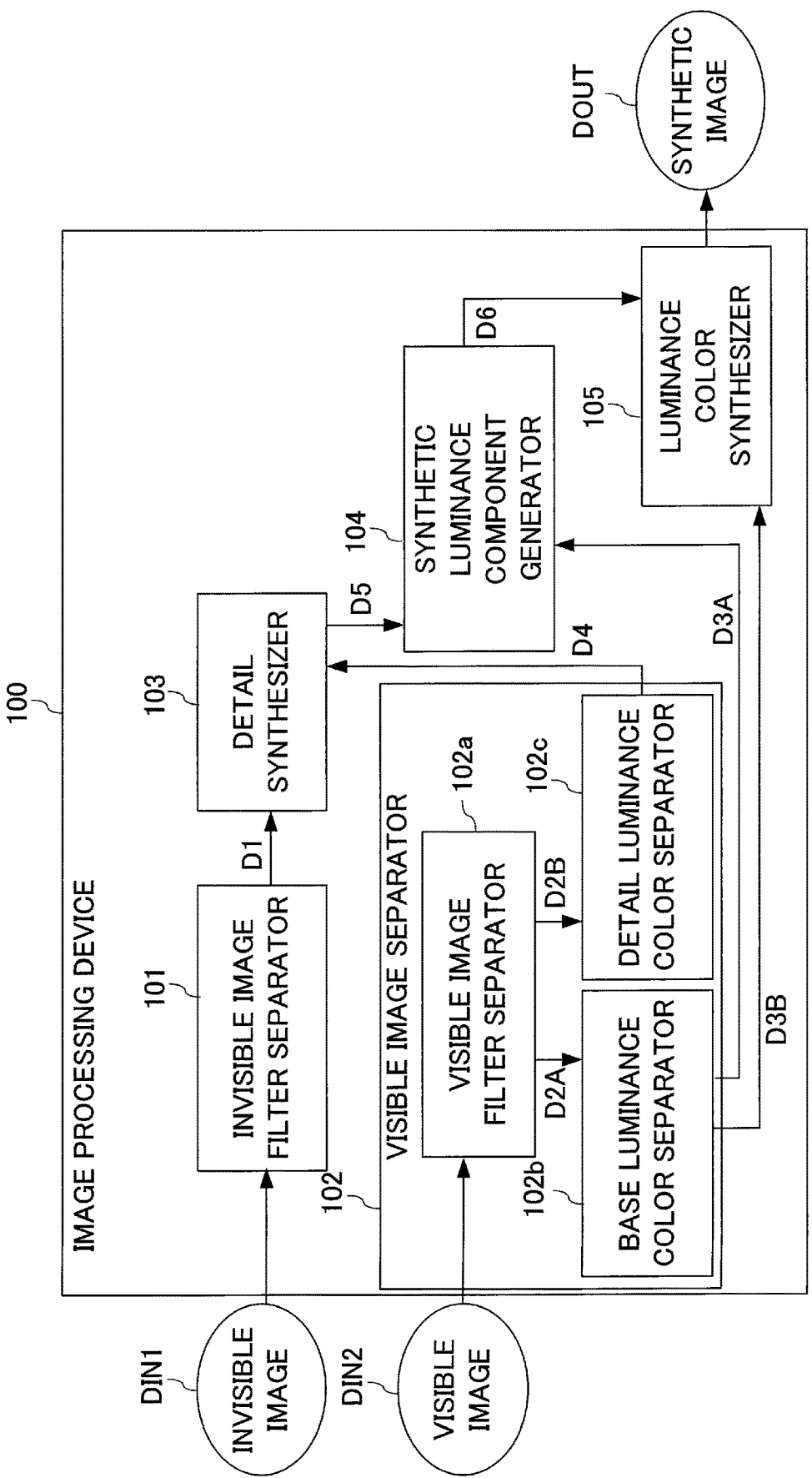
FIG. 1 is a block diagram showing a schematic configuration of an image processing device according to a first embodiment of the present invention.

First, an outline of components of an image processing device 100 according to a first embodiment will be described. FIG. 1 is a block diagram showing a schematic configuration of the image processing device 100 according to the first embodiment of the present invention. As shown in FIG. 1, the image processing device 100 according to the first embodiment includes an invisible image filter separator 101 as a second image separator (invisible image separator), a visible image separator 102 as a first image separator, a detail synthesizer 103, a synthetic luminance component generator 104, and a luminance color synthesizer 105. The visible image separator 102 includes a visible image filter separator 102a, a base luminance color separator 102b and a detail luminance color separator 102c.

As shown in FIG. 1, an invisible image (second image) DIN1 and a visible image (first image) DIN2 as image data are inputted to the image processing device 100. The invisible image DIN1 and the visible image DIN2 are desired to be acquired by image capturing means having the same visual field. Having the same visual field means that the image capturing means capturing the invisible image DIN1 and the image capturing means capturing the visible image DIN2 have the same image capture region (image capture range), which does not require that the image capture region of the image capturing means capturing the invisible image DIN1 and the image capture region of the image capturing means capturing the visible image DIN2 perfectly coincide with each other.

For example, images acquired from an invisible image camera and a visible image camera arranged adjacent to each other can be directly used as the invisible image DIN1 and the visible image DIN2. It is also possible to perform adjustment of aligning positions of images acquired from an invisible image camera and a visible image camera arranged adjacent to each other and use the images after the adjustment of aligning the positions as the invisible image DIN1 and the visible image DIN2.

For example, the invisible image DIN1 and the visible image DIN2 can be acquired by use of an image sensor having infrared pixels detecting infrared light for the detection of the invisible image DIN1 and RGB pixels detecting visible light for the detection of the visible image DIN2 (red pixels detecting red light, green pixels detecting green light, and blue pixels detecting blue light). It is also possible to acquire two types of images instead of the invisible image DIN1 and the visible image DIN2 by using an image sensor having white pixels (W pixels) detecting white light and RGB pixels, for example.

As shown in FIG. 1, the invisible image filter separator 101 performs filter processing on the invisible image DIN1 and thereby generates an invisible detail component D1 that is a detail component of the invisible image DIN1 (second detail component). The visible image filter separator 102a performs filter processing on the visible image DIN2 and thereby generates a visible base component D2A that is a base component of the visible image (first base component) and a visible detail component D2B that is a detail component of the visible image (first detail component).

As shown in FIG. 1, the base luminance color separator 102b separates the visible base component D2A into a visible luminance base component (luminance component in the visible base component) D3A as a first luminance base component and a visible color base component (color component in the visible base component) D3B as a first color base component. The detail luminance color separator 102c extracts a visible luminance detail component (luminance component in the visible detail component) D4 from the visible detail component D2B.

As shown in FIG. 1, the detail synthesizer 103 generates a synthetic luminance detail component D5 by combining the invisible detail component D1 and the visible luminance detail component D4. The synthetic luminance component generator 104 generates a synthetic luminance component D6 by combining the synthetic luminance detail component D5 and the visible luminance base component D3A. The luminance color synthesizer 105 generates and outputs a synthetic image DOUT by combining the synthetic luminance component D6 and the visible color base component D3B.

Figure 2A:
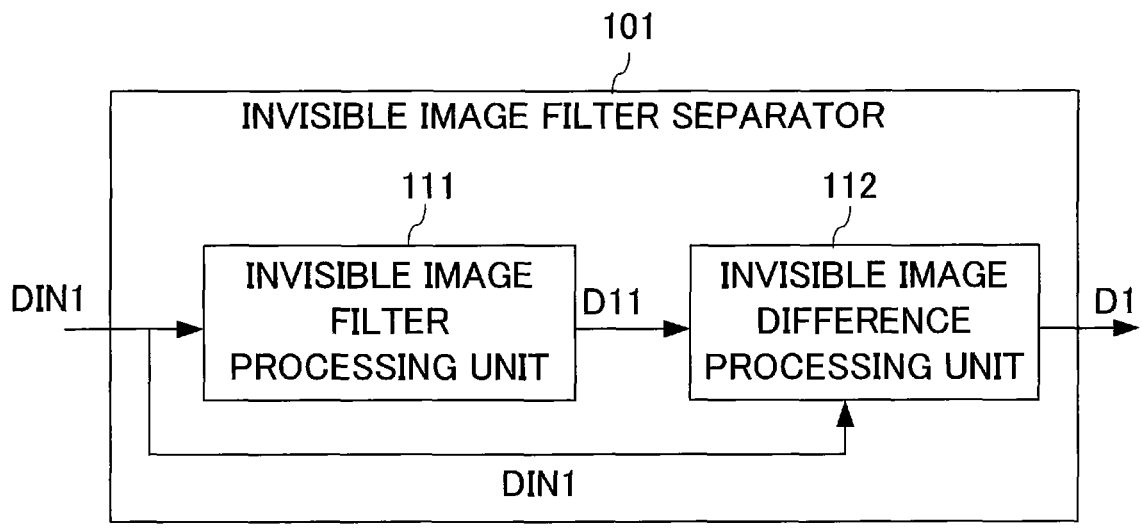
FIG. 2(a) is a block diagram showing an example of a schematic configuration of an invisible image filter separator in the first embodiment.
Figure 2B:
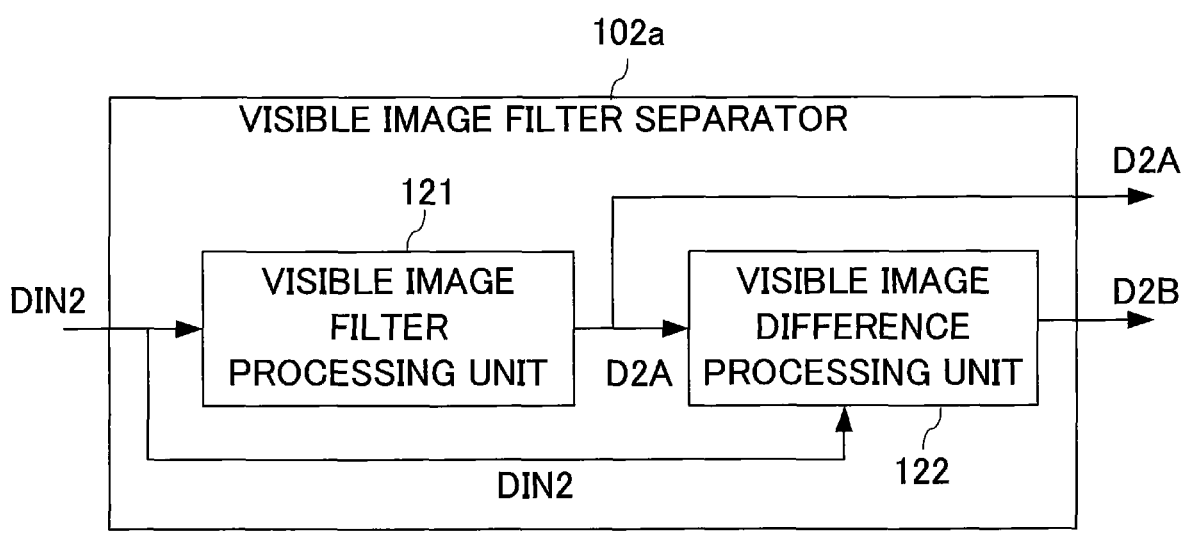
FIG. 2(b) is a block diagram showing an example of a schematic configuration of a visible image filter separator in the first embodiment.

Next, details of the components of the image processing device 100 according to the first embodiment will be described. FIG. 2(a) is a block diagram showing an example of a schematic configuration of the invisible image filter separator 101 in the first embodiment, and FIG. 2(b) is a block diagram showing an example of a schematic configuration of the visible image filter separator 102a in the first embodiment. As shown in FIG. 2(a), the invisible image filter separator 101 includes an invisible image filter processing unit 111 and an invisible image difference processing unit 112.

The invisible image filter processing unit 111 receives the invisible image DIN1, performs filter processing for smoothing on the received invisible image DIN1, and thereby generates a smoothed invisible base component D11. The invisible image difference processing unit 112 receives the smoothed invisible base component D11 and the invisible image DIN1 and generates the invisible detail component D1 that is the difference between the invisible base component D11 and the invisible image DIN1.

The filter performing the filter processing in the invisible image filter processing unit 111 is, for example, a smoothing filter such as a box filter, a Gaussian filter or the like, or an edge preservation smoothing filter such as a bilateral filter, a guided filter or the like.

As shown in FIG. 2(b), the visible image filter separator 102a includes a visible image filter processing unit 121 and a visible image difference processing unit 122. The visible image filter processing unit 121 receives the visible image DIN2, performs filter processing for smoothing on the received visible image DIN2, and thereby generates a smoothed visible base component D2A. The visible image difference processing unit 122 receives the smoothed visible base component D2A and the visible image DIN2 and generates the visible detail component D2B that is the difference between the visible base component D2A and the visible image DIN2. The filter processing in the visible image filter separator 102a is desired to be performed on each channel (e.g., on each of an R signal, a G signal and a B signal).

As shown in FIG. 1, the base luminance color separator 102b receives the visible base component D2A from the visible image filter separator 102a and separates the received visible base component D2A into the visible luminance base component D3A that is a luminance component and the visible color base component D3B that is a color component. In a case where the visible image is an RGB image, the base luminance color separator 102b converts the RGB image into one of the HSV (Hue, Saturation, Lightness) format made up of hue, saturation and lightness, the YUV format made up of luminance and color components, and the YCbCr format made up of luminance and color components. The base luminance color separator 102b outputs an H (hue) channel or a Y (luminance) channel as the visible luminance base component D3A, and outputs remaining channels of color, hue and saturation or the like as the visible color base component D3B.

The detail luminance color separator 102c receives the visible detail component D2B from the visible image filter separator 102a and extracts the visible luminance detail component D4 that is a luminance component from the visible detail component D2B. The detail luminance color separator 102c outputs an H channel, a Y channel or the like as the visible luminance detail component D4 in a similar manner to the base luminance color separator 102b.

In contrast, the detail luminance color separator 102c does not extract or separate a visible color detail component from the visible detail component D2B. Since the visible color detail component is a component causing color noise under low illuminance conditions, avoiding the use of the visible color detail component makes it possible to generate a high visibility synthetic image DOUT with reduced influence of the color noise under low illuminance conditions.

Figure 3:
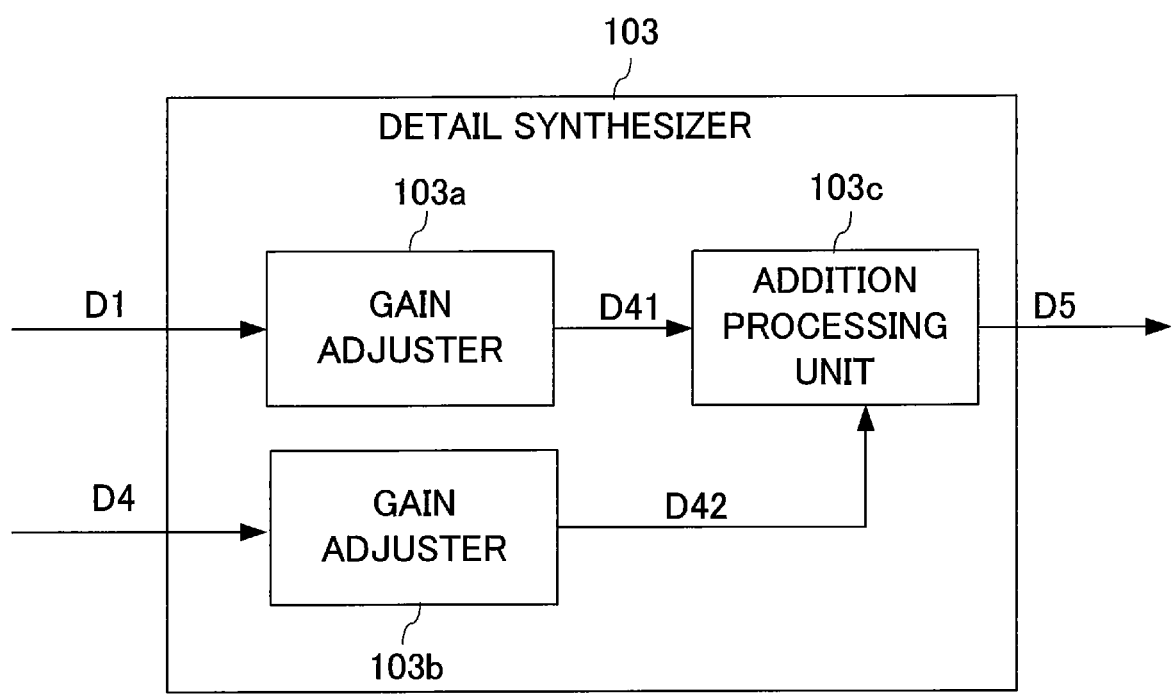
FIG. 3 is a block diagram showing a schematic configuration of a detail synthesizer in the first embodiment.

FIG. 3 is a block diagram showing a schematic configuration of the detail synthesizer 103 in the first embodiment. As shown in FIG. 3, the detail synthesizer 103 in the first embodiment includes gain adjusters 103a and 103b and an addition processing unit 103c. The detail synthesizer 103 generates the synthetic luminance detail component D5 by combining the invisible detail component D1 received from the invisible image filter separator 101 and the visible luminance detail component D4 received from the detail luminance color separator 102c.

The gain adjuster 103a receives the invisible detail component D1 from the invisible image filter separator 101, performs gain adjustment (amplification or attenuation) on the invisible detail component D1, and thereby outputs a gain adjustment component D41 as a second gain adjustment component. The gain adjuster 103b receives the visible luminance detail component D4 from the detail luminance color separator 102c, performs gain adjustment (amplification or attenuation) on the visible luminance detail component D4, and thereby outputs a gain adjustment component D42 as a first gain adjustment component.

The addition processing unit 103c receives the gain adjustment component D41 and the gain adjustment component D42 from the gain adjusters 103a and 103b and outputs a value D5 as a weighted average (summation average) of the components. The gains acquired by the gain adjusters 103a and 103b may either be fixed values or adjusted depending on the scene, application or image characteristics.

In the detail synthesizer 103, the gain adjustment is made separately for the invisible detail component D1 and the visible luminance detail component D4, which enables gain adjustment suitable for the type of the application and makes it possible to deal with a plurality of applications with ease. Specifically, when it is desired to carry out shadow correction by means of infrared light irradiation, for example, the visible image DIN2 is considered to contain a lot of noise, and thus the gain for the visible luminance detail component D4 is set at a low value and the gain for the invisible detail component D1 is set at a value higher than or equal to 1.

Further, when it is desired to carry out haze correction by using atmospheric penetrability of infrared light, the gain for the visible luminance detail component D4 is set at a value close to 1 and the gain for the invisible detail component D1 is set at a value higher than or equal to 1. If the gain is set high in order to increase the visibility, an enhancement process operates, and thus it is desirable to separately set each gain depending on the type of the application, characteristics of image capturing equipment, or the like.

The gains in these cases can be obtained by simple addition of scalar values, or may be obtained by power calculation such as gamma conversion.

The synthetic luminance component generator 104 outputs the synthetic luminance component D6 by combining the synthetic luminance detail component D5 received from the detail synthesizer 103 and the visible luminance base component D3A received from the base luminance color separator 102b. Methods employable for the combining by the synthetic luminance component generator 104 include a method taking a simple summation average and a method selecting a component having high visibility in regard to each region, for example.

The luminance color synthesizer 105 outputs the synthetic image DOUT by combining the synthetic luminance component D6 received from the synthetic luminance component generator 104 and the visible color base component D3B received from the base luminance color separator 102b. The method of combining the luminance component and color component used by the luminance color synthesizer 105 is assumed to be a method corresponding to the method of the conversion performed by the base luminance color separator 102b and the detail luminance color separator 102c. For example, if the base luminance color separator 102b and the detail luminance color separator 102c have performed conversion from RGB to YUV, the luminance color synthesizer 105 performs conversion from YUV to RGB. In contrast, if the base luminance color separator 102b and the detail luminance color separator 102c have performed conversion from YUV to RGB, the luminance color synthesizer 105 performs conversion from RGB to YUV.

(1-2) Operation

Next, the filter processing by use of the guided filter will be explained. By using the following linear regression coefficients:

$$\bar{a} \text{ and } \bar{b},$$

the base component q as the output of the guided filter and the input image I can be expressed in a linear relationship like the following expression (1):

$$q = \bar{a}I + \bar{b} \qquad \text{expression (1)}$$

Here, by using Ω defined as a local region centering at a certain pixel x of the input image I, the linear regression coefficients $$\bar{a}(x) \text{ and } \bar{b}(x)$$

can be represented by expression (2).

$$\bar{a}(x) = \sum_{y \in \Omega(x)} a(y)^2, \qquad \text{expression (2)}$$
$$\bar{b}(x) = \sum_{y \in \Omega(x)} b(y)^2$$

Next, a method of deriving the linear regression coefficients will be explained. A pixel value of variance var of the input image I corresponding to the pixel position x is represented by expression (3).

$$\text{var}I(x) = \sum_{y \in \Omega(x)} I(y)^2 - \left( \sum_{y \in \Omega(x)} I(y) \right)^2 \qquad \text{expression (3)}$$

Subsequently, a smoothing process is performed only on a region where the variance value is extremely small, and in order to preserve texture of the other regions, grayscale conversion is performed on the variance varI(x) according to the following expression (4), by which the linear regression coefficient a(x) is obtained:

$$a(x) = \frac{\text{var}I(x)}{\text{var}I(x) + eps} \qquad \text{expression (4)}$$

where eps is a constant parameter determining the degree of the edge preservation.

Further, the coefficient b is derived according to expression (5).

$$b(x) = \sum_{y \in \Omega(x)} I(y) - a(x) \sum_{y \in \Omega(x)} I(y) \qquad \text{expression (5)}$$

Based on the linear regression coefficients a(x) and b(x) obtained from the expressions (4) and (5), the guided filter output value q is derived. The value q corresponds to the invisible base component D11 as shown in FIG. 2(a).

As shown in FIG. 2(a), the invisible detail component D1 is obtained from the difference between the invisible image DIN1 and the invisible base component D11.

While an example using a smoothing filter as the processing performed by the invisible image filter separator 101 has been described above, the processing by the invisible image filter separator 101 is not limited to this example; it is also possible to directly output the detail component by using a high-pass filter such as a Laplacian filter.

Figure 4:
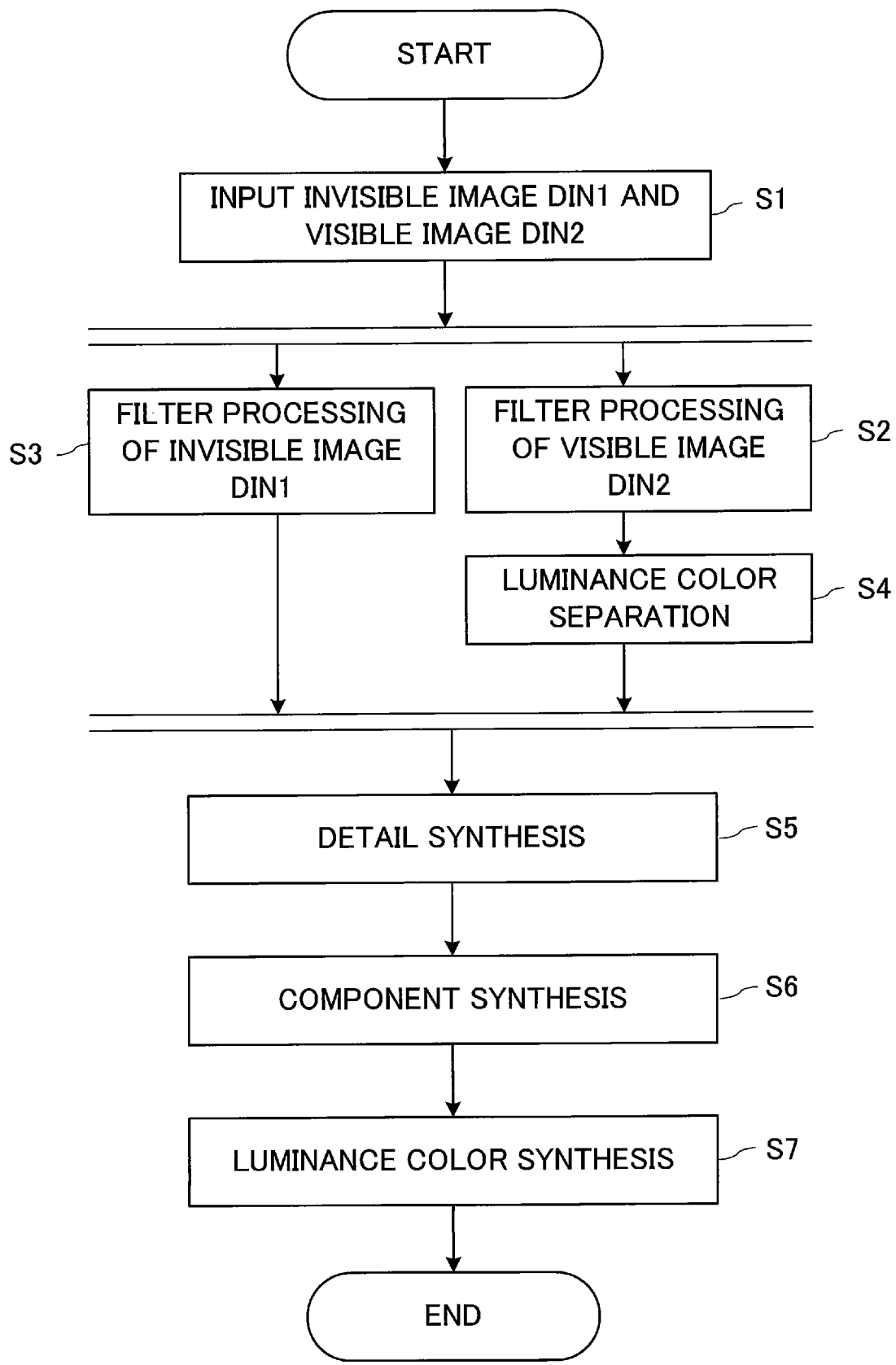
FIG. 4 is a flowchart showing the operation of the image processing device according to the first embodiment.

Next, the operation of the image processing device 100 according to the first embodiment will be described. FIG. 4 is a flowchart showing the operation of the image processing device 100 according to the first embodiment. As shown in FIG. 4, when the operation of the image processing device 100 is started, the invisible image DIN1 and the visible image DIN2 are inputted to the image processing device 100 in step S1.

In the next step S2, the visible image DIN2 is inputted to the visible image filter separator 102a and the filter processing is performed on the visible image DIN2.

In the next step S4, the luminance color separation processing is performed on the visible base component D2A and the visible detail component D2B.

In parallel with the processing of the steps S2 and S4, in step S3, the invisible image DIN1 is inputted to the invisible image filter separator 101 and the filter processing is performed on the invisible image DIN1.

In the next step S5, the synthetic luminance detail component D5 is obtained by combining the invisible detail component D1 and the visible luminance detail component D4 (detail synthesis).

In the next step S6, the synthetic luminance component D6 is obtained by combining the synthetic luminance detail component D5 and the visible luminance base component D3A (component synthesis).

Finally, in step S7, the synthetic image DOUT is obtained by combining the synthetic luminance component D6 and the visible color base component D3B (luminance color synthesis).

(1-3) Effect

With the image processing device 100 according to the first embodiment, the filter processing and the luminance color separation processing are performed on the visible image, and the visible color detail component causing color noise is not used for the synthesis. Accordingly, even in a case where a scene in which the visible image contains color noise (e.g., scene under a low illuminance condition) has been captured, a high visibility synthetic image DOUT with reduced influence of the color noise can be acquired.

In the image processing device 100 according to the first embodiment, the detail synthesizer 103 includes the gain adjusters 103a and 103b and the addition processing unit 103c and generates the synthetic luminance detail component D5 by taking the weighted average (summation average) of the invisible detail component D1 and the visible luminance detail component D4 after the gain adjustment. Accordingly, acquisition of images having higher visibility can be realized in a variety of scenes.

In the image processing device 100 according to the first embodiment, the filter processing in the invisible image filter separator 101 and the visible image filter separator 102a is formed only of simple filter operation processing and addition and subtraction processing. Accordingly, the image processing can be implemented at a low calculation cost.

In the image processing device 100 according to the first embodiment, high-speed image processing suitable for real-time processing is performed with a configuration of simplicity and a low calculation cost. Accordingly, an object or target that should be paid attention to can be distinguished with ease even when a scene in which the distinction is conventionally difficult only with a visible image has been captured.

While a case where the inputs to the image processing device 100 are a visible image and an invisible image has been taken as an example in this embodiment, equivalent effects can be obtained without the need of limiting the inputs to the above-described combination as long as the inputs are a combination of an image with high visibility and an image with low visibility. For example, the image with high visibility can be a long time exposure image and the image with low visibility can be a short time exposure image. Alternatively, the image with high visibility can be a bright environment image captured in the daytime and the image with low visibility can be a dark environment image captured in the nighttime.

(2) Second Embodiment (2-1) Configuration

Figure 5:
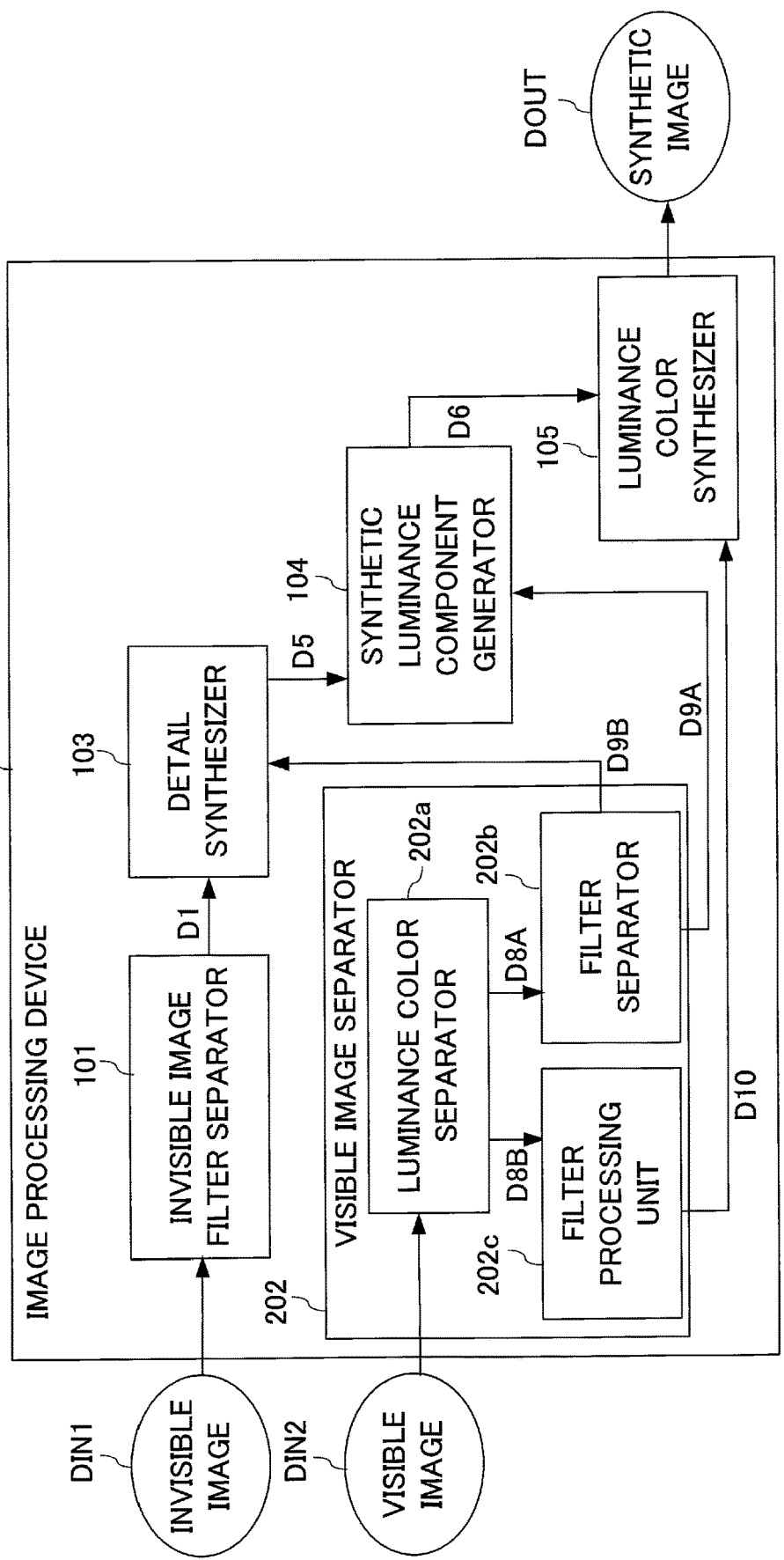
FIG. 5 is a block diagram showing a schematic configuration of an image processing device according to a second embodiment of the present invention.

FIG. 5 is a block diagram showing a schematic configuration of an image processing device 200 according to a second embodiment of the present invention. In FIG. 5, each component identical or corresponding to a component shown in FIG. 1 (first embodiment) is assigned the same reference character as in FIG. 1. As shown in FIG. 5, the image processing device 200 according to the second embodiment differs from the first embodiment in the configuration of a visible image separator 202. Specifically, the visible image separator 202 in the second embodiment includes a luminance color separator 202a as a first image luminance color separator, a filter separator 202b as a first luminance component separator, and a filter processing unit 202c as a first color component separator.

In the image processing device 100 according to the first embodiment, the filter processing is performed on the visible image DIN2 and thereafter the luminance color separation processing is performed on the separated components (the visible base component D2A and the visible detail component D2B). In contrast, in the image processing device 200 according to the second embodiment, the luminance color separation processing is first performed on the visible image DIN2 and the filter processing is performed on the separated luminance component and color component after the luminance color separation processing.

The luminance color separator 202a receives the visible image DIN2 and separates the received visible image DIN2 into a visible luminance component D8A that is a luminance component and a visible color component D8B that is a color component. The separation processing in the luminance color separator 202a is processing similar to those in the base luminance color separator 102b and the detail luminance color separator 102c in the first embodiment.

The filter separator 202b receives the visible luminance component D8A from the luminance color separator 202a, separates the received visible luminance component D8A into a visible luminance base component D9A that is a base component and a visible luminance detail component D9B that is a detail component, and outputs the visible luminance base component D9A and the visible luminance detail component D9B. The separation processing in the filter separator 202b is processing similar to those in the invisible image filter separator 101 and the visible image filter separator 102a in the first embodiment.

The filter processing unit 202c receives the visible color component D8B from the luminance color separator 202a, performs the smoothing by means of the filter processing on the received visible color component D8B, and outputs the smoothed visible color base component D10. For the filter processing, it is desirable to use an edge preservation smoothing filter such as a bilateral filter or a guided filter besides a smoothing filter such as a box filter or a Gaussian filter.

The configurations of the detail synthesizer 103, the synthetic luminance component generator 104 and the luminance color synthesizer 105 in the second embodiment are the same as those in the first embodiment.

(2-2) Operation

Figure 6:
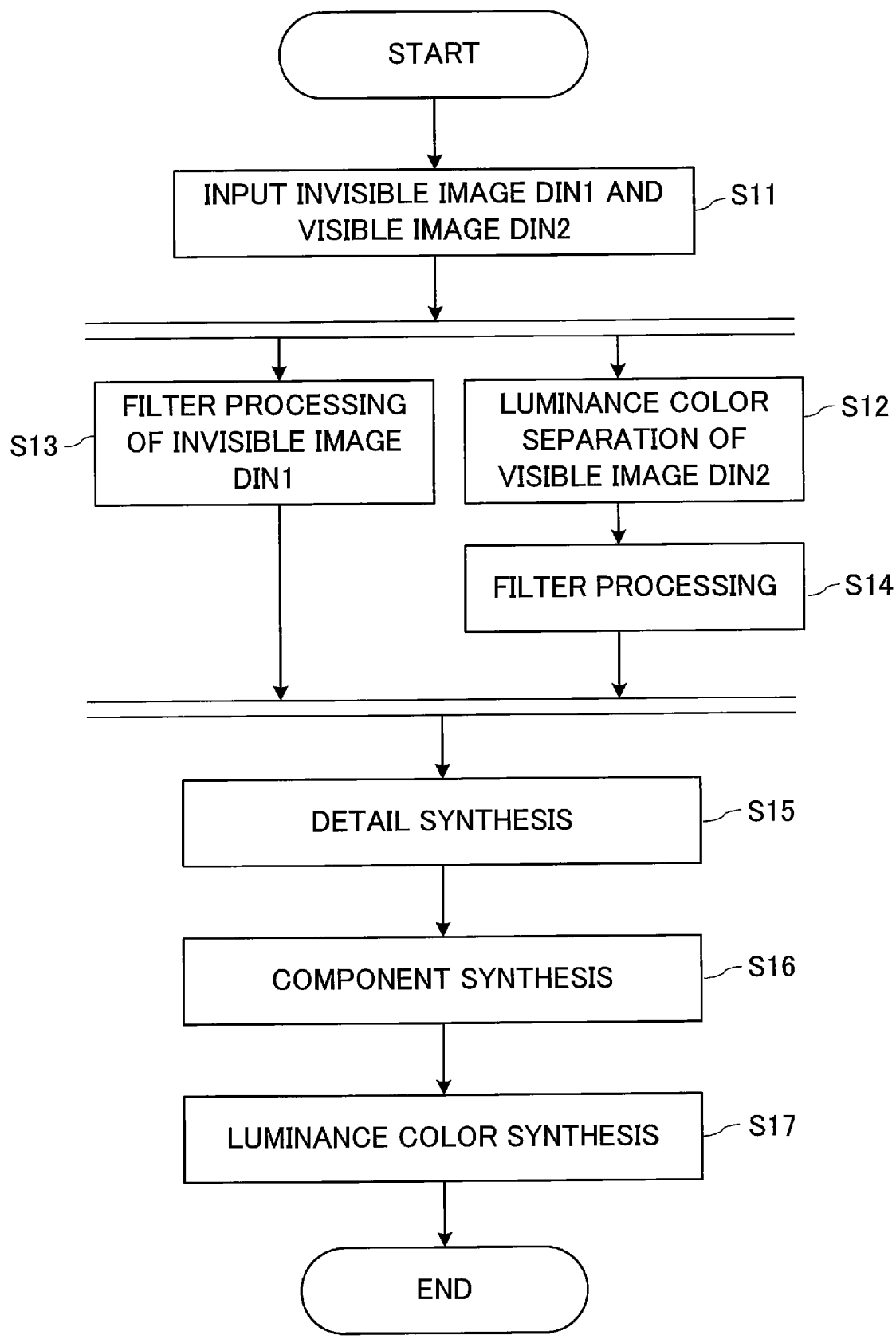
FIG. 6 is a flowchart showing the operation of the image processing device according to the second embodiment.

Next, the operation of the image processing device 200 according to the second embodiment will be described. FIG. 6 is a flowchart showing the operation of the image processing device 200 according to the second embodiment. As shown in FIG. 6, when the operation of the image processing device 200 is started, the invisible image DIN1 and the visible image DIN2 are inputted to the image processing device 200 in step S11.

In the next step S12, the luminance color separation processing is performed on the visible image DIN2.

In the next step S14, the filter processing is performed on the visible luminance component D8A and the visible color component D8B.

In parallel with the processing of the steps S12 and S14, in the next step S13, the invisible image DIN1 is inputted to the invisible image filter separator 101, by which the filter processing is performed on the invisible image DIN1.

In the next step S15, the synthetic luminance detail component D5 is obtained by combining the invisible detail component D1 and the visible luminance detail component D4 (detail synthesis).

In the next step S16, the synthetic luminance component D6 is obtained by combining the synthetic luminance detail component D5 and the visible luminance base component D3A (component synthesis).

In the final step S17, the synthetic image DOUT is obtained by combining the synthetic luminance component D6 and the visible color base component D3B (luminance color synthesis).

(2-3) Effect

With the image processing device 200 according to the second embodiment, effects similar to those of the image processing device 100 according to the first embodiment can be obtained.

With the image processing device 200 according to the second embodiment, the filter processing is performed after performing the luminance color separation processing on the visible image DIN2, and thus the number of times of performing the luminance color separation processing can be reduced to one and the number of calculations can be reduced further compared to the image processing device 100 according to the first embodiment.

(3) Third Embodiment

Figure 7:
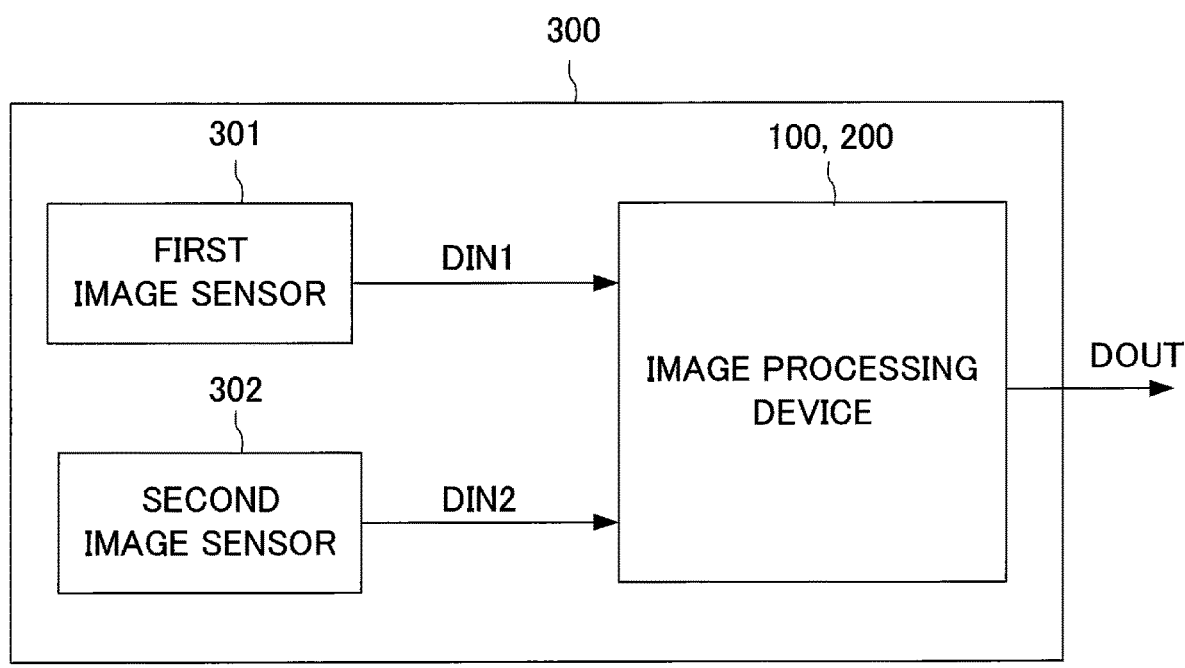
FIG. 7 is a block diagram showing a schematic configuration of an image capturing device according to a third embodiment of the present invention.

FIG. 7 is a block diagram showing a schematic configuration of an image capturing device 300 according to a third embodiment of the present invention. As shown in FIG. 7, the image capturing device 300 includes the image processing device 100 according to the first embodiment (or the image processing device 200 according to the second embodiment), a first image sensor 301, and a second image sensor 302.

As the first image sensor 301 and the second image sensor 302, CCD (Charged Coupled Device) image sensors, CMOS (Complementary Metal Oxide Semiconductor) image sensors, or the like can be employed, for example.

The first image sensor 301 acquires the invisible image DIN1 by imaging an image capture object and inputs the invisible image DIN1 to the image processing device 100. The second image sensor 302 acquires the visible image DIN2 by imaging the image capture object and inputs the visible image DIN2 to the image processing device 100. The first image sensor 301 and the second image sensor 302 are desired to be arranged adjacently and close to each other to have the same visual field.

In a case where the invisible image DIN1 acquired by the first image sensor 301 and the visible image DIN2 acquired by the second image sensor 302 have the same visual field, the invisible image DIN1 and the visible image DIN2 can be directly used for the synthesis. In a case where the region of the invisible image DIN1 and the region of the visible image DIN2 differ from each other, these images can be used for the synthesis processing after performing a process of aligning positions of these two images with each other, by which a captured image having high visibility can be acquired.

(4) Modifications

While the present invention has been described above based on specific embodiments, these embodiments are just examples for illustration and the present invention is not restricted to these embodiments.

Figure 8:
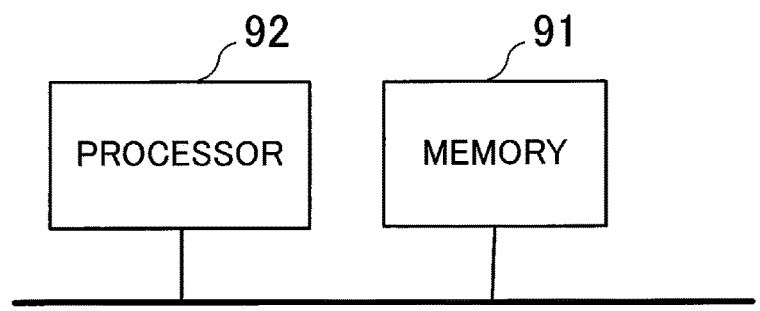
FIG. 8 is a hardware configuration diagram showing a configuration of a modification.

FIG. 8 is a hardware configuration diagram showing a configuration of a modification of the image processing devices 100 and 200 according to the above-described first and second embodiments. While the image processing device 100, 200 can be implemented by a semiconductor integrated circuit, the image processing device 100, 200 may also be implemented by using a memory 91 as a storage device for storing a program as software and a processor 92 as an information processing unit for executing the program stored in the memory 91 (e.g., by a computer) as shown in FIG. 8. It is also possible to implement part of the image processing device 100, 200 by the memory 91 shown in FIG. 8 and the processor 92 for executing a program.

Besides an infrared image acquired by using infrared light, it is also possible to use an ultraviolet light image acquired by using ultraviolet light, a radar image, etc. as the invisible image in the above description of the embodiments.

While a visible image and an invisible image are combined in the above description of the embodiments, a combination of an RGB image and a narrowband image (including a visible band) is also usable besides the combination of a visible image and an invisible image.

The present invention is especially effective when a low-noise specific spectrum image and a visible image including color information are combined together by means of light source irradiation in a case where a monitoring camera or an in-vehicle camera captures images while irradiating the object with light from a specific spectrum light source such as a near-infrared light source, for example.

DESCRIPTION OF REFERENCE CHARACTERS 100, 200: image processing device, 101: invisible image separator (invisible image filter separator, second image separator), 102, 202: visible image separator (first image separator), 102a: visible image filter separator (first image filter separator), 102b: base luminance color separator, 102c: detail luminance color separator, 103: detail synthesizer, 103a, 103b: gain adjuster, 103c: addition processing unit, 104: synthetic luminance component generator, 105: luminance color synthesizer, 111: invisible image filter processing unit (second image filter processing unit), 112: invisible image difference processing unit (second image difference processing unit), 121: visible image filter processing unit (first image filter processing unit), 122: visible image difference processing unit (first image difference processing unit), 202a: luminance color separator, 202b: filter separator, 202c: filter processing unit, 300: image capturing device, 301: first image sensor, 302: second image sensor, DIN1: invisible image (second image), DIN2: visible image (first image), DOUT: synthetic image.

What is claimed is:

1. An image processing device for generating a synthetic image from a first image acquired by receiving visible light that is light in a first wavelength range and a second image acquired by receiving invisible light that is light in a second wavelength range different from the first wavelength range, the first image and the second image having a same visual field, the image processing device including circuitry to:
separate, from the first image, a first luminance base component that is a luminance component separated from a first base component that is a base component of the first image, a first color base component that is a color component separated from the first base component, and a first luminance detail component that is a luminance component separated from a first detail component that is a detail component of the first image;
separate a second detail component that is a detail component of the second image from the second image;
generate a synthetic luminance detail component that is a value obtained by taking a summation average of a second gain adjustment component obtained by performing gain adjustment on the second detail component and a first gain adjustment component obtained by performing gain adjustment on the first luminance detail component using a gain smaller than a gain used for the gain adjustment on the second detail component;
generate a synthetic luminance component by combining the synthetic luminance detail component and the first luminance base component; and
generate the synthetic image by combining the synthetic luminance component and the first color base component, wherein
the first detail component, which includes both the first luminance detail component and a color detail component, is separated from the first image signal via a filtering process performed prior to separation of the first luminance detail component from the first detail component.

2. The image processing device according to claim 1, wherein the circuitry is further configured to:
perform edge preservation smoothing filter processing on the first image, thereby generating the smoothed first base component and to generate the first detail component from a difference between the first base component and the first image;
separate the first luminance base component that is the luminance component of the first base component and the first color base component that is the color component of the first base component from the first base component; and
separate the first luminance detail component that is the luminance component of the first detail component from the first detail component.

3. The image processing device according to claim 1, wherein the circuitry is further configured to:
separate a first luminance component that is a luminance component of the first image and a first color component that is a color component of the first image from the first image;
separate the first luminance base component that is a base component of the first luminance component and the first luminance detail component that is a detail component of the first luminance component from the first luminance component; and
separate the first color base component that is a base component of the first color component from the first color component.

4. The image processing device according to claim 1, wherein the process further includes:
performing filter processing on the second image, thereby generating a smoothed second base component; and
generating the second detail component from a difference between the second base component and the second image.

5. An image capturing device comprising:
the image processing device according to claim 1;
a first image sensor for acquiring the second image; and
a second image sensor arranged adjacent to the first image sensor for acquiring the first image.

6. The image capturing device according to claim 5, wherein the image capturing device performs adjustment of aligning positions of the second image acquired by the first image sensor and the first image acquired by the second image sensor.

7. The image capturing device according to claim 1, wherein the color detail component is not used by the circuitry to generate the synthetic image.

8. An image processing method for generating a synthetic image from a first image acquired by receiving visible light that is light in a first wavelength range and a second image acquired by receiving invisible light that is light in a second wavelength range different from the first wavelength range, the first image and the second image having a same visual field, the image processing method comprising:
separating, from the first image, a first luminance base component that is a luminance component separated from a first base component that is a base component of the first image, a first color base component that is a color component separated from the first base component, and a first luminance detail component that is a luminance component separated from a first detail component that is a detail component of the first image;
separating a second detail component that is a detail component of the second image from the second image;
generating a synthetic luminance detail component that is a value obtained by taking a summation average of a second gain adjustment component obtained by performing gain adjustment on the second detail component and a first gain adjustment component obtained by performing gain adjustment on the first luminance detail component using a gain smaller than a gain used for the gain adjustment on the second detail component;
generating a synthetic luminance component by combining the synthetic luminance detail component and the first luminance base component; and
generating the synthetic image by combining the synthetic luminance component and the first color base component, wherein the first detail component, which includes both the first luminance detail component and a color detail component, is separated from the first image signal via a filtering process performed prior to separation of the first luminance detail component from the first detail component.

9. The image processing method according to claim 8, wherein the color detail component is not used by the method to generate the synthetic image.

10. An image processing device for generating a synthetic image from a first image acquired by receiving visible light that is light in a first wavelength range and a second image acquired by receiving invisible light that is light in a second wavelength range different from the first wavelength range, the first image and the second image having a same visual field, the image processing device comprising:
   a processor to execute a program; and
   a memory to store the program which, when executed by the processor, performs
   a process of separating, from the first image, a first luminance base component that is a luminance component separated from a first base component that is a base component of the first image, a first color base component that is a color component separated from the first base component, and a first luminance detail component that is a luminance component separated from a first detail component that is a detail component of the first image;
   a process of separating a second detail component that is a detail component of the second image from the second image;
   a process of generating a synthetic luminance detail component that is a value obtained by taking a summation average of a first second gain adjustment component obtained by performing gain adjustment on the first luminance second detail component and a second first gain adjustment component obtained by performing gain adjustment on the second first luminance detail component using a gain smaller than a gain used for the gain adjustment on the second detail component;
   a process of generating a synthetic luminance component by combining the synthetic luminance detail component and the first luminance base component; and
   a process of generating the synthetic image by combining the synthetic luminance component and the first color base component, wherein
   the first detail component, which includes both the first luminance detail component and a color detail component, is separated from the first image signal via a filtering process performed prior to separation of the first luminance detail component from the first detail component.

11. The image processing device according to claim 10, wherein the color detail component is not used by the program to generate the synthetic image.

* * * * *